United States Patent
Park et al.

(10) Patent No.: US 6,495,979 B2
(45) Date of Patent: Dec. 17, 2002

(54) POWER-SAVING APPARATUS AND METHOD FOR COMPUTER PERIPHERAL DEVICES

(75) Inventors: Kil-Soo Park, Suwon (KR); Jin-Sang Hwang, Suwon (KR); Kyung-Choon Youn, Kyungki-do (KR)

(73) Assignee: SamSung Electronics Co., Ltd., Suwon (KR)

( * ) Notice: Subject to any disclaimer, the term of this patent is extended or adjusted under 35 U.S.C. 154(b) by 73 days.

(21) Appl. No.: 09/750,704

(22) Filed: Jan. 2, 2001

(65) Prior Publication Data

US 2002/0070691 A1 Jun. 13, 2002

(30) Foreign Application Priority Data

Aug. 11, 2000 (KR) ............................. 00/46587

(51) Int. Cl.$^7$ ................................. H04N 3/27

(52) U.S. Cl. .................. 315/406; 315/107; 713/320

(58) Field of Search ................. 713/321, 320, 713/340; 315/94, 105, 106, 107, 406

(56) References Cited

U.S. PATENT DOCUMENTS 5,925,132 A * 7/1999 Kadokura ................. 713/323

* cited by examiner

*Primary Examiner*—David Vu
(74) *Attorney, Agent, or Firm*—Robert E. Bushnell, Esq.

(57) ABSTRACT

A power-saving apparatus comprises: a heater; a control unit for detecting at least two power-saving commands, and for outputting a first power-saving control signal and a second power-saving control signal; a power supply unit for supplying rated voltages required for peripheral devices; a power switching circuit for cutting off all rated voltages supplied to the peripheral devices, including the heater but excluding the control unit, when the first power-saving control signal is generated, and for starting the supply of all rated voltages cut off when the second power-saving control signal is generated; and a quick start circuit for supplying, to the heater, a quick start voltage for a certain time period when the start control signal is generated. A power-saving method comprises performing a power-saving mode by cutting off the voltages supplied to the peripheral devices when the power-saving control signal or command is received, determining whether a recovery command is detected, and recovering to a normal mode when a recovery command is detected.

21 Claims, 8 Drawing Sheets

POWER-SAVING APPARATUS AND METHOD FOR COMPUTER PERIPHERAL DEVICES

CLAIM OF PRIORITY

This application makes reference to, incorporates the same herein, and claims all benefits accruing under 35 U.S.C. §119 from my application COMPUTER PERIPHERALS HAVING POWER-SAVING CIRCUIT AND METHOD filed with the Korean Industrial Property Office on Aug. 11, 2000 and there duly assigned Serial No. 46587/2000.

BACKGROUND OF THE INVENTION

1 Technical Field

The present invention relates to a power-saving apparatus and method for computer peripheral devices and, more particularly, to a power-saving apparatus and method for computer peripheral devices in computers using heaters, in which electric power consumption is minimized by cutting off all power supplies to the devices, including the heaters, regardless of the kinds of power-saving commands when a power-saving command is inputted. The devices are normally operated in a short time period by heating the heaters rapidly when a recovery command is inputted from an external source.

2 Related Art

In recent years, matters of environmental energy have emerged internationally, and diverse technologies for decreasing electric power consumption have been proposed. Accordingly, various efforts have been made to reduce electric power consumption in video display devices and laser beam printers, which are electronic appliances widely used in the context of office automation.

For example, in the area of video display devices, the display power management system (DPMS) has been proposed as an international standard by the Video Electronics Standard Association (VESA). A video display device has a normal mode and a power-saving mode according to the DPMS standard, and the power-saving mode is divided into a standby mode, a suspend mode, and an off mode.

A video display device recognizes at least two or more power-saving commands, and then performs at least two or more power-saving modes according to the DPMS standard. In the case of some dummy printers, even in the case of laser beam printers, the power-saving technique can be carried out, as known, when a power-saving command is received from a computer main body.

Typically, power management systems are disclosed in U.S. Pat. Nos. 5,489,935, 5,648,799, 5,389,952, and 5,774,116, which have at least two or more power-saving levels according to at least two or more power-saving commands.

However, as stated above, the systems disclosed in the U.S. Pat. Nos. 5,648,799, 5,389,952, and 5,774,116 have the problem of consuming unnecessary electric power since a rated voltage of 6.3V is supplied to a heater in order to reduce the time for recovering the normal mode from the power-saving modes, such as the standby mode and the suspend mode, even though power consumption is reduced to the maximum by cutting off all voltages supplied to devices, including the heater, in the power-saving mode such as the off mode.

The above problem is caused due to the properties of a heater which is not easily heated. The problem of the heater is somewhat solved in the heater-heating circuits disclosed in U.S. Pat. No. 3,886,401 and Korean Patent Nos. 93-14719 and 96-65937.

However, the circuits disclosed in U.S. Pat. No. 3,886,401 and Korean Patent Nos. 93-14719 rapidly heat the heater by supplying a voltage higher than the rated voltage to the heater for a certain time period in the initial voltage supply, so that a normal display is carried out for a short time period, without any concrete descriptions regarding how heater-heating circuits are controlled when the normal mode is recovered from the power-saving mode.

Further, the circuit disclosed in the Korean Patent No. 96-65937 rapidly heats the heater by supplying a voltage higher than the rated voltage for a predetermined time period based on the control of a microcomputer when recovering the normal mode from the power-saving mode, or when a power switch is turned on, so that a normal display is carried out for a short time period, without any concrete descriptions regarding how the heater-heating circuit is controlled when the normal mode is returned from the power-saving mode.

Furthermore, when a cathode ray tube (CRT) is employed, as in the disclosure of Korean Patent No. 96-65937, the heater undergoes much stress due to an excessive heater voltage, causing a shortening of the life span of the cathode ray tube (CRT), so that the applications have been hardly found. Particularly, there exists a problem in that the reliability of the apparatus deteriorates since the normal mode switched from the power-saving mode is more frequently carried out than the power switch-on mode is carried out.

SUMMARY OF THE INVENTION

Accordingly, in order to solve the above problems, it is a first object of the present invention to provide a power-saving apparatus and method for computer peripheral devices, in which all the voltage supplies to the devices, including heaters, are cut off regardless of the kinds of power-saving commands, when a power-saving command is detected, and the heater is heated at a rapid speed when a recovery command is detected in the computer peripheral devices using a heater.

Further, it is a second object of the present invention to provide a power-saving apparatus and method for computer peripheral devices, in which all voltage supplies to the devices, including heaters, are cut off regardless of the kinds of power-saving commands when a power-saving command is detected and the heaters are selectively heated at a rapid speed or a normal speed according to the kind of power-saving command when a recovery command is detected in the computer peripheral devices, using heaters.

Furthermore, it is a third object of the present invention to provide a power-saving apparatus and method for computer peripheral devices, in which all voltage supplies to the devices, including heaters, are cut off regardless of the kinds of power-saving commands when a power-saving command is detected, and the heaters are heated at a rapid speed or a normal speed by user selection regardless of the kinds of power-saving commands when a recovery command is detected in the computer peripheral devices using the heaters.

In order to achieve the above first object, a power-saving apparatus according to the present invention comprises: a control unit for detecting at least two or more power-saving commands, for outputting a first power-saving control signal regardless of the kind of power-saving command when the power-saving command is detected, and for outputting a second power-saving control signal at the same time as outputting a start control signal for a certain time period when a recovery command is detected; a power supply unit for supplying rated voltages required for peripheral devices; a power switching circuit for cutting off all the rated voltages supplied to the peripheral devices, including a heater, except for the control unit when the first power-saving control signal is inputted from the control unit, and for starting the supply of all the rated voltages cut off if the second power-saving control signal is inputted from the control unit; and a quick start circuit for supplying, to the heater, a quick start voltage higher than a rated voltage for a certain time period if a start control signal is inputted from the control unit.

In order to achieve the above first object, a power-saving method according to the present invention comprises the steps of: determining whether a power-saving command is detected; performing a power-saving mode by cutting off all voltages supplied to peripheral devices, including a heater, except for a control unit regardless of the kind of a power-saving command if the power-saving command is detected in the first step; determining whether a recovery command is detected; and recovering the normal mode by starting the supply of all the voltages cut off in the preceding step at the same time as a quick start voltage, higher than a rated voltage for a certain time period, is detected if the recovery command is detected in third step.

In order to achieve the second object as stated above, a power-saving apparatus according to the present invention comprises: a heater; a control unit for detecting at least two or more power-saving commands, for outputting a first power-saving control signal, regardless of the kind of power-saving command, when the power-saving command is detected, for outputting a second power-saving control signal, simultaneously with detection of the kind of power-saving command, when a recovery command is detected, and for outputting a start control signal for a certain time period when the power-saving command requests a quick start; a power supply unit for supplying rated voltages required for peripheral devices; a power switching circuit for cutting off all voltages supplied to the peripheral devices, including the heater but excluding the control unit, when the first power-saving control signal is inputted from the control unit, and for starting the supply of all voltages cut off when the second power-saving control signal is inputted from the control unit; and a quick start circuit for supplying, to the heater, a quick start voltage higher than a rated voltage for a certain time period when the start control signal is inputted from the control unit.

In order to achieve the second object as stated above, a power-saving method according to the present invention comprises the steps of: determining whether a power-saving command is detected; performing a power-saving mode by cutting off all voltages supplied to peripheral devices, including a heater but excluding a control unit, regardless of the kind of power-saving command when the power-saving command is detected as a result of the previous step; determining whether a recovery command is detected; detecting the kind of power-saving command when the recovery command is detected as a result of the preceding step; determining whether the power-saving command requests a normal start or a quick start; recovering the normal mode by starting the supply of all voltages cut off in the power-saving mode performing step when the power-saving command requests the normal start as a result of the detecting step; and recovering the normal mode by starting the supply of all voltages cut off in the power-saving mode performing step at the same time as supplying, to the heater, a quick start voltage higher than a rated voltage for a certain time period, when the power-saving command requests the quick start as a result of the detecting step.

In order to achieve the third object as stated above, a power-saving method according to the present invention comprises the steps of: determining whether a power-saving command is detected; performing a power-saving mode by cutting off all voltages supplied to peripheral devices, including a heater but excluding a control unit, regardless of the kind of power-saving command when the power-saving command is detected as a result of the previous step; determining whether a recovery command is detected; determining whether a start mode is selected by users when the recovery command is detected as a result of the preceding step determining whether a normal start mode or a quick start mode is selected when the start mode is selected by the users as a result of the preceding step; recovering a normal mode by starting the supply of all voltages cut off in the power-saving mode performing step regardless of the kind of power-saving command when the normal start mode is selected by the users as a result of the preceding step; restoring the normal mode by starting the supply of all voltages cut off in the power-saving mode performing step regardless of the kind of power-saving command simultaneously with supplying to the heater a quick start voltage higher than a rated voltage for a certain time period; detecting the kind of power-saving command and determining whether the power-saving command requests the normal start or the quick start when the start mode is not selected by the users as a result of the step of determining whether a start mode is selected; recovering the normal mode by starting the supply of all voltages cut off in the power-saving mode performing step when the power-saving command requests the normal start as a result of the detecting step; and recovering the normal mode by starting the supply of all voltages cut off in the power-saving mode performing step simultaneously with supplying to the heater the quick start voltage higher than the rated voltage for a certain time period when the power-saving command requests the quick start as a result of the detecting step.

Accordingly, power consumption is minimized by cutting off all voltages supplied to the peripheral devices, including the heater, regardless of the kind of power-saving command when the power-saving command is detected, and the computer peripheral devices are normally operated in a short time period by rapidly heating the heater when the recovery command is detected.

BRIEF DESCRIPTION OF THE DRAWINGS

A more complete appreciation of the invention, and many of the attendant advantages, thereof, will be readily apparent as the same becomes better understood by reference to the following detailed description when considered in conjunction with the accompanying drawings in which like reference symbols indicate the same or similar components, and wherein.

DETAILED DESCRIPTION OF THE PREFERRED EMBODIMENTS

Hereinafter, apparatuses and methods according to the present invention will be described in detail with reference to the accompanying drawings.

Figure 1:
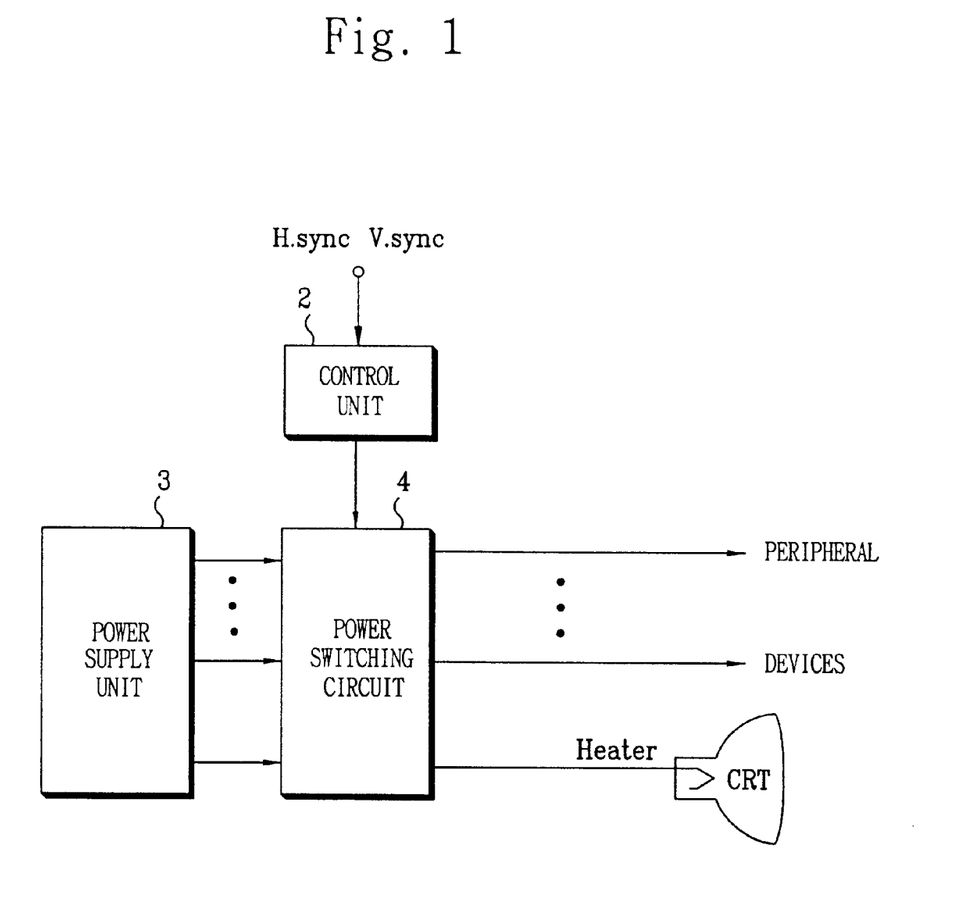
FIG. 1 is a block diagram showing a power-saving apparatus of a video display device.

Operation of a video display device will be described for the normal mode, standby mode, suspend mode, and off mode with reference to Table 1 and FIG. 1, where FIG. 1 is a block diagram showing a power-saving apparatus for a video display device.

TABLE 1

| mode | power-saving/recovery command | | |
|---|---|---|---|
| | Horizontal sync. | Vertical sync. | power consumption |
| normal | H | H | 100% |
| standby | L | H | 80% |
| suspend | H | L | <15W |
| off | L | L | <5W |

First, in the normal mode, if high-level horizontal and vertical synchronous signals H.sync and V.sync, respectively, are inputted from a computer main body, a control unit 2 controls a power switching circuit 4 to supply, to all devices, power voltages outputted from a voltage supply unit 3, so that the video display unit is normally operated.

Further, in the standby mode, if low-level horizontal and vertical synchronous signals H.sync and V.sync, respectively, are inputted from the computer main body, the control unit 2 controls the voltage supply circuit 4 to supply, to some of the devices, including a heater, voltages outputted from the voltage supply unit 3, so that power consumption is slightly reduced. When the normal mode is recovered, display recovery is rapidly processed since the heater is in a heated state.

Further, in the suspend mode, if the high-level horizontal synchronous signal H.sync and the low-level vertical synchronous signal V.sync are inputted, the control unit 2 controls the power switching circuit 4 to supply, to only the heater 1, the power voltages outputted from the voltage supply unit 3, so that the power consumption is greatly reduced. When the normal mode is recovered, the display recovery is rapidly processed since the heater 1 is in the heated state.

Lastly, in the off mode, if the low-level horizontal and vertical synchronous signals H.sync and V.sync, respectively, are inputted from the computer main body, the control unit 2 controls the power switching circuit 4 to cut off all the power voltages supplied to the devices, so that the power consumption is reduced to the maximum. When the normal mode is recovered, the display recovery is slowly processed since the heater 1 is not in the heated state.

At this time, in order to recover the normal mode from the power-saving mode, the voltage of 5 V is supplied at all times to the control unit 2, even in the power-saving mode.

Figure 2:
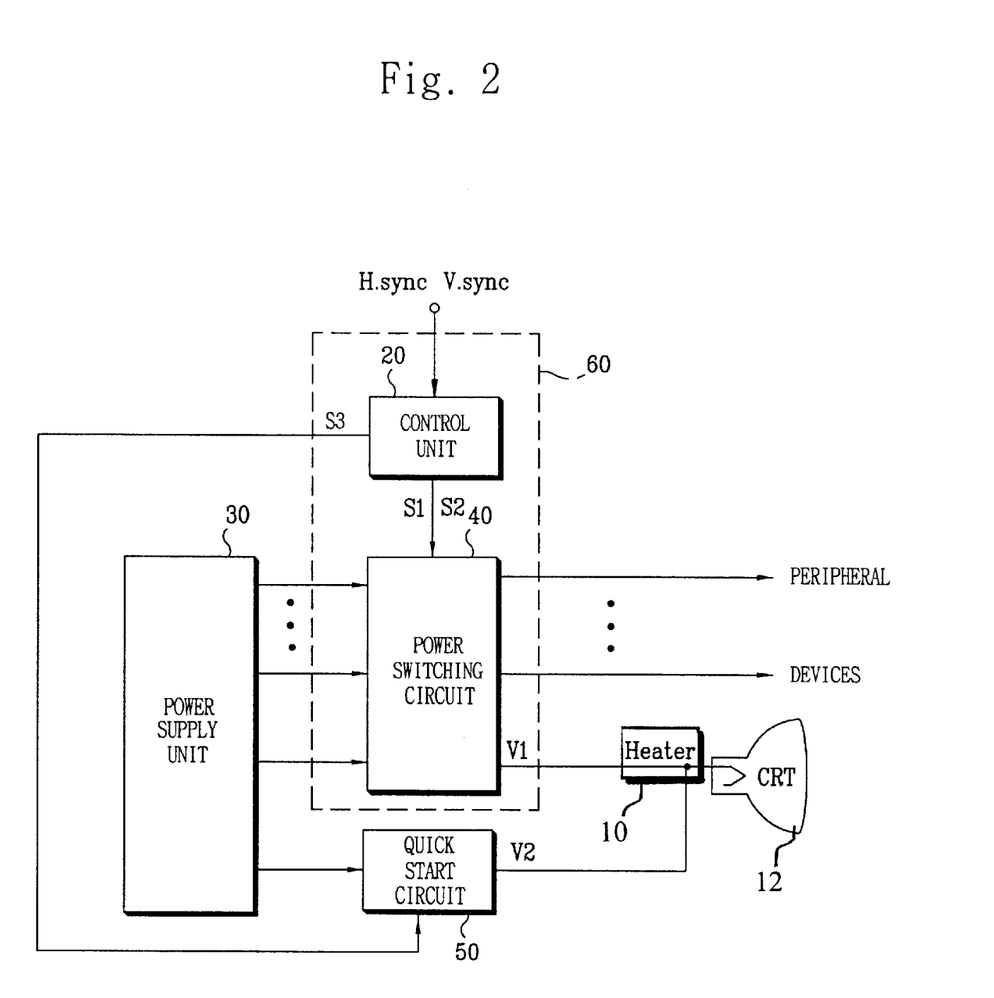
FIG. 2 is a block diagram showing a power-saving apparatus of a video display device according to first and second embodiments of the present invention.
Figure 3:
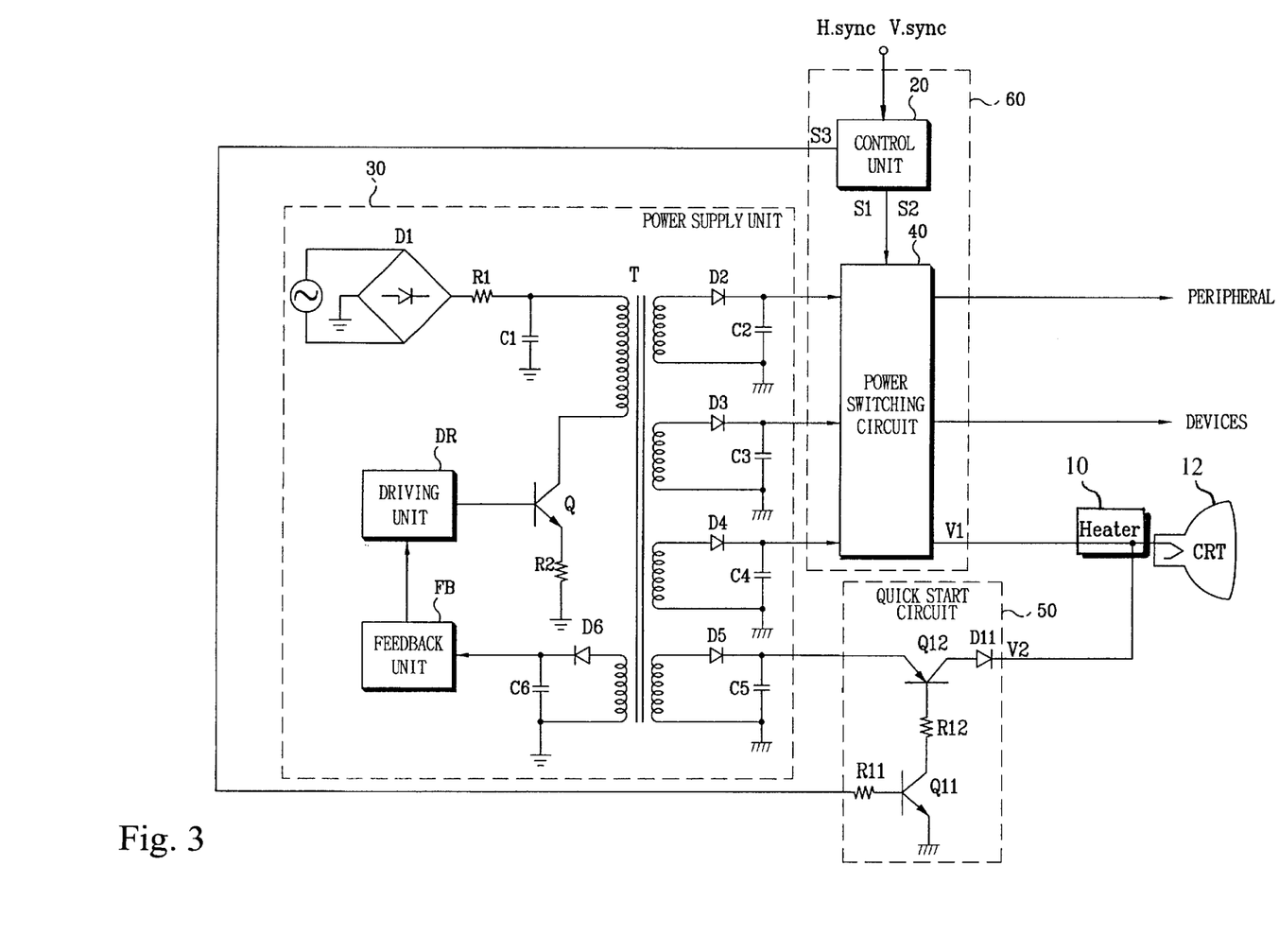
FIG. 3 is a circuit diagram of FIG. 2.

FIG. 2 is a block diagram showing a power-saving apparatus of a video display device according to first and second embodiments of the present invention, and FIG. 3 is a circuit diagram of FIG. 2.

As shown in FIG. 2, a power-saving apparatus of a video display device according to a first embodiment of the present invention comprises: a heater 10 of a cathode ray tube (CRT) 12; a control unit 20 for detecting at least two power-saving commands, for outputting a first power-saving control signal S1 regardless of the kinds of power-saving commands when the power-saving command is detected, for outputting a second power-saving control signal S2 when a recovery command is detected while outputting a start control signal S3 for a predetermined time period when a recovery command is detected; a power supply unit 30 for supplying rated voltages necessary for respective peripheral devices; a power switching circuit 40 for cutting off all rated voltages supplied to the devices, including the heater 10 but excluding the control unit 20, when the first power-saving control signal S1 is received from the control unit 20, and for supplying all rated voltages cut off when the second power-saving control signal S2 is inputted from the control unit 20; and a quick start circuit 50 for supplying to the heater 10 a quick start voltage V2 higher than a rated voltage for a predetermined time period when the start control signal S3 is inputted from the control unit 20.

As shown in FIG. 2, a power-saving apparatus of a video display device according to a second embodiment of the present invention comprises: a heater 10 of a cathode ray tube (CRT) 12; a control unit 20 for detecting at least two power-saving commands, for outputting a first power-saving control signal S1 regardless of the kinds of power-saving commands when the power-saving commands are detected, for detecting the kinds of power-saving commands simultaneously with outputting a second power-saving control signal S2 when a recovery command is detected, and for outputting a start control signal S3 for a predetermined time period when a quick start is a required power-saving command; a power supply unit 30 for supplying rated voltages required for respective peripheral devices; a power switching circuit 40 for cutting off all rated voltages supplied to the respective devices, including the heater 10 but excluding the control unit 20, when the first power-saving control signal S1 is inputted from the control unit 20, and for supplying all the voltages cut off when the second power-saving control signal S2 is inputted from the control unit 20; and a quick start circuit 50 for supplying to the heater 10 a quick start voltage V2 higher than a rated voltage V1 for a predetermined time period when the start control signal S3 is inputted from the control unit 20.

According to the first and second embodiments, as shown in FIG. 3, the quick start circuit 50 includes a first NPN-type transistor Q11 having a base electrode for receiving the start control signal S3 from the control unit 20 through a resistor R11, and an emitter electrode which is grounded, and for performing a switch-on operation when the start control signal S3 is inputted from the control unit 20; a second PNP-type transistor Q12 having a base electrode connected to a collector electrode of the first transistor Q11 through a resistor R12, an emitter electrode through which the quick start voltage V2 is supplied from the power supply unit 30, and a collector electrode connected in parallel with the rated heater voltage V1, and for supplying the quick start voltage V2 to the heater 10 together with the switching-on of the first transistor Q11; and a reverse voltage cutoff diode D11 connected to the collector of transistor Q12 for preventing the supply of the rated heater voltage V1 to the quick start circuit 50.

Further, the power voltage unit 30 is embodied with a general switching mode power supply, and produces from a commercial AC voltage input plural power voltages necessary for the respective devices.

The power switching circuit 40 is constituted with plural switching devices, such as transistors, which are switched on and off based on the first and second power-saving control signals S1 and S2, respectively, of the control unit 20 to supply and cut off plural voltages outputted from the power supply unit 30. In this way, lower voltages than normal are supplied to the respective devices within the limitation of satisfying a certain minimum power required to reduce power consumption. The control unit 20 and the power switching circuit 40 are referred to as a power-saving control unit 60.

As shown in FIG. 2, in a video display device having a heater 10 of a cathode ray tube (CRT) 12, a power supply unit 30, and a quick start circuit 50, a power-saving apparatus of a video display device according to a fourth embodiment of the present invention further comprises a power-saving control unit 60 for detecting at least one power-saving command inputted from an external source, for controlling the operations of devices at a minimum power consumption level regardless of the kinds of power-saving commands when the power-saving commands are detected, and for controlling the supply of an overvoltage V2 to the heater 10 for a certain time period by operating the quick start circuit 50 for a certain time period when a recovery command is detected.

Furthermore, as shown in FIG. 2, in a video display device having a heater 10 of a cathode ray tube (CRT) 12, a power supply unit 30, and a quick start circuit 50, a power-saving apparatus of a video display device according to a fifth embodiment of the present invention further comprises a power-saving control unit 60 for detecting at least one power-saving command inputted from an external source, for controlling the operations of peripheral devices at a minimum power consumption level regardless of the kinds of power-saving commands when the power-saving commands are detected, for detecting the kind of power-saving command detected when a recovery command is detected, and for controlling the supply of an overvoltage V2 to the heater 10 for a certain time period by operating the quick start circuit 50 for a certain time period when the quick start is required by the power-saving command.

At this time, in order to recover the normal mode from the power-saving mode, the control unit 20 is supplied with a voltage of 5V at all times, even in the execution of the power-saving mode.

Next, the operations of the power-saving apparatus and method of a video display device according to the first, second and third embodiments will be described with reference to FIGS. 5, 6, and 7, which are flow charts for explaining the power-saving methods of a video display device according to the first, second and third embodiments, respectively, of the present invention.

1. First Embodiment

Figure 5:
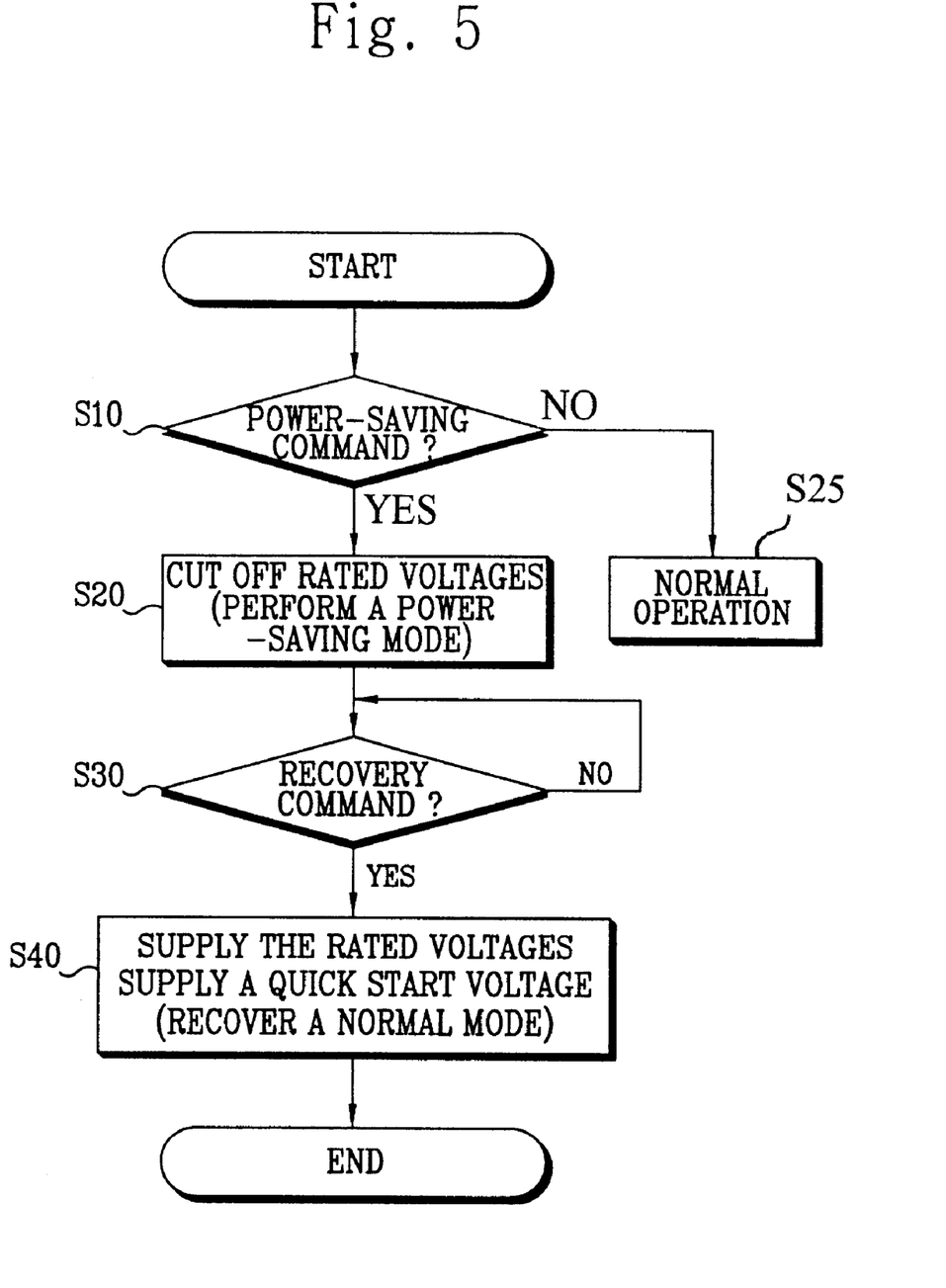
FIG. 5 is a flow chart showing a power-saving method of a video display device according to a first embodiment of the present invention.

Referring to FIG. 5, the control unit 20 determines whether a power-saving command is inputted from a computer main body in step S10. If the power-saving command is inputted, the control unit 20 adopts the power-saving mode for cutting off all voltages supplied to the devices, including the heater 10 of cathode ray tube 12, regardless of the kind of power-saving command inputted in step S20. If the power-saving command is not inputted, normal operation proceeds in step S25.

That is, in general, the computer main body determines whether to output high-level horizontal and vertical synchronous signals H.sync and V.sync, respectively, according to the power-saving modes shown in Table 1. In the normal mode, the high-level horizontal and vertical synchronous signals H.sync and V.sync, respectively, are outputted. In the standby mode, a low-level horizontal synchronous signal H.sync and the high-level vertical synchronous signal V.sync are outputted. In the suspend mode, the high-level horizontal synchronous signal H.sync and the low-level vertical synchronous signal V.sync are outputted. In the off mode, the low-level horizontal and vertical synchronous signals H.sync and V.sync, respectively, are outputted.

Accordingly, a video display device determines whether the horizontal and vertical synchronous signals are inputted in order to determine the kind of power-saving mode, and then performs the corresponding power-saving mode.

However, the control unit 20 of the present invention inputs a power-saving command, and then outputs the first power-saving control signal S1 to the power switching circuit 40, regardless of the kinds of power-saving commands.

That is, if the control unit 20 inputs the low-level horizontal synchronous signal H.sync and the high-level vertical synchronous signal V.sync, inputs the high-level vertical synchronous signal H.sync and the low-level vertical synchronous signal V.sync, or inputs the low-level horizontal and vertical synchronous signals H.sync and V.sync, respectively, (that is, if one or more low-level signals of the horizontal and vertical synchronous signals H.sync and V.sync, respectively, are inputted from the computer main body), the first power-saving control signal S1 is outputted to the power switching circuit 40.

When the power switching circuit 40 inputs the first power-saving control signal S1, the power switching circuit 40 cuts off all rated voltages supplied to the devices, including the heater 10, from the power supply unit 30.

In the meantime, the control unit 20 determines whether a recovery command is inputted from the computer main body in step S30. If the recovery command is inputted, the control unit 20 starts the supply of all the voltages cut off so far, and supplies to the heater 10 of the cathode ray tube 12 the quick start voltage V2 higher than the rated voltage V1 for a certain time period to recover the normal mode in step S40.

That is, if the control unit 20 inputs the high-level horizontal and vertical synchronous signals from the computer main body, the control unit 20 outputs the second power-saving control signal S2 to the power switching circuit 40 simultaneously with outputting the start control signal S3 to the quick start circuit 50 (preferably, for four seconds).

Accordingly, the power switching circuit 40 supplied with the second power-saving control signal S2 starts the supply of all the rated voltages cut off so far, and the quick start circuit 50 responds to the start control signal S3 y supplying, to the heater 10, the quick start voltage V2 (for example, 9 V) higher than the rated voltage V1 (for example, 6.3 V) for four seconds.

Figure 4A:
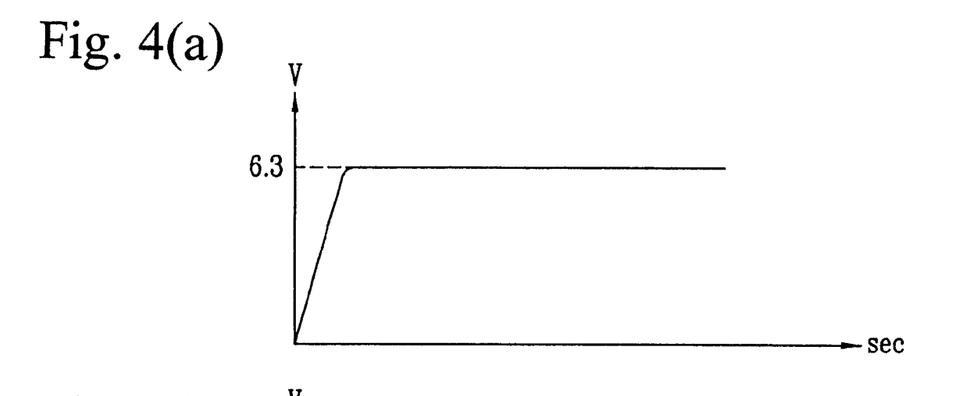
FIGS. 4(a), 4(b), 4(c) show waveforms of heater voltages supplied to a heater according to the present invention.
Figure 4B:
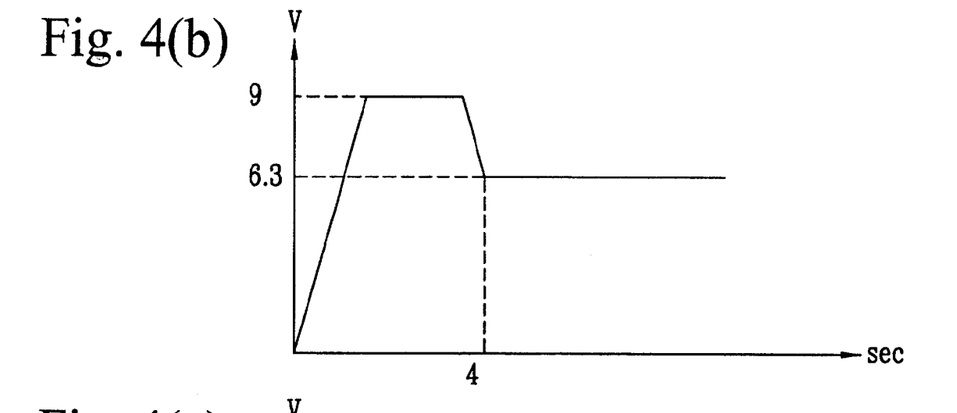
Figure 4C:
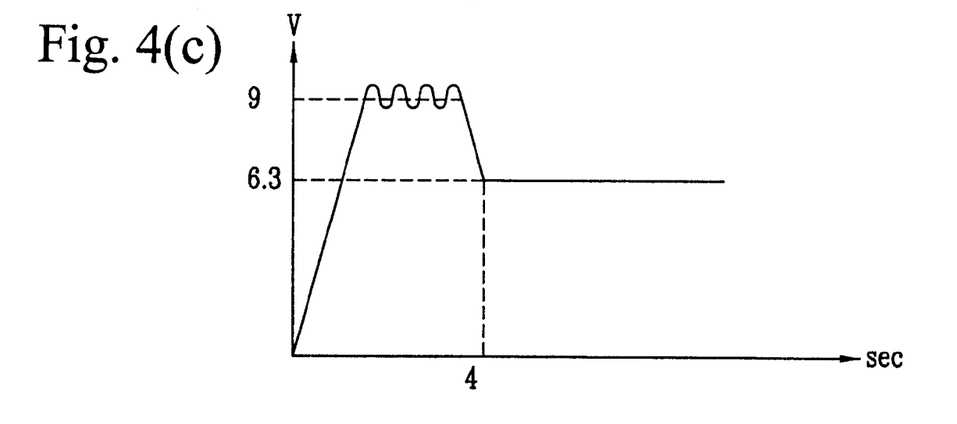

That is, the power switching circuit 40 responds to the second power-saving control signal S2 by supplying the rated voltage V1 (for example, 6.3 V) to the heater 10, and the quick start circuit 50 responds to the start control signal S3 by supplying to the heater 10, the quick start voltage V2 (for example, 9 V) higher than the rated voltage V1 (for example, 6.3 V) for four seconds so that a voltage as shown in FIG. 4(b) is supplied to the heater 10 for the heating of heater 10 at a rapid speed in the recovery of the normal mode.

Describing the quick start circuit 50 in more detail, in the recovery of the normal mode from the power-saving mode, the first transistor Q11 is turned on as the control unit 20 supplies the high-level start control signal S2 to the base electrode of the NPN-type transistor Q11, and the PNP-type transistor Q12 is turned on as the transistor Q11 is turned on.

As the transistor Q12 is turned on, the quick start voltage V2 (for example, 9V) higher than the rated voltage V1 (for example, 6.3V) is supplied to the heater 10.

The selection of the quick start mode can be indicated by a light-emitting diode (LED) which is mounted on the exterior of the video display device.

Accordingly, the first embodiment of the present invention cuts off all voltages of the devices, including the heater 10, regardless of the kinds of power-saving commands when the power-saving commands are inputted, so that the power consumption is minimized and a normal display is recovered at a rapid speed by heating the heater 10 of the cathode ray tube 12 at a rapid speed when a recovery command is inputted.

In general, a voltage applied to a heater is somewhat different for each make of cathode ray tube (CRT), but the heater voltage is in the range of 6.0~6.4 Vrms, and a voltage of 6.3 V is generally applied. In the case of pre-heating, the voltage range is 4.5~5.5 Vrms, and a voltage of 5 V is generally applied.

The heater voltage affects the life span of a cathode ray tube (CRT) greatly, so that the rising of the heater voltage shortens display recovery time, but greatly affects and shortens the life of the cathode ray tube (CRT). It is also known that the lowering of the heater voltage affects and shortens the life of the cathode ray tube (CRT), so that the heating voltage is generally set in the range of 6.0~6.4 Vrms.

Due to the reliability as stated above, the conventional heater-heating circuit is not actually applied to products. However, it has been confirmed as a result of testing that the apparatus and method according to the present invention have no abnormality in reliability.

Describing the reliability test method in more detail, a voltage of 9 V is supplied for four seconds, a voltage of 6.3 V is supplied for six seconds, and a voltage of 0 V is supplied for 170 seconds, to the heaters of a general video display device and a video display device according to the present invention, respectively, and the latter forms one cycle. Such operations are repeated more than 54000 times.

The reason that an overvoltage is applied for the initial four seconds is in order to satisfy the display recovery time of less than four seconds. In the case of 15" to 17" cathode ray tubes, the display recovery time of four seconds can be satisfied even in the application of an overvoltage for the initial three seconds. Further, the reason for cutting off the supply of a voltage for 170 seconds is to fully cool the heaters so that they have a room temperature.

That is, as a test result, if a voltage of 9V is supplied to the heater for three to four seconds, a display is normally recovered within four seconds.

The two test results show that maximum cathode currents (i.e., maximum currents capable of flowing in the cathode during normal operations) of electrical characteristic stability factors of cathode ray tubes (CRT) have an identical pattern in the general video display device and in the video display device to which the present invention is applied, the cathode warming-up times (an electron-emitting time or a time for a current intensity of 100 $\mu$A to be reached) are detected to be extremely similar, and leakage currents between a heater and a cathode, and overcurrents between the heater and the cathode, are detected as "0".

The reason for more than 54000 repetitions of the test is because of the expected number of times for the quick start to be capable of occurring during an average life span of a cathode ray tube (CRT), and significant errors which are able to shorten the life span of the cathode ray tube are not found.

Further, despite such reliability test as stated above, the second and third embodiments described below selectively drive a quick start circuit according to a power-saving command, so that reliability is further enhanced by reducing the number of times of imparting stress to the heater.

2. Second Embodiment

Figure 6:
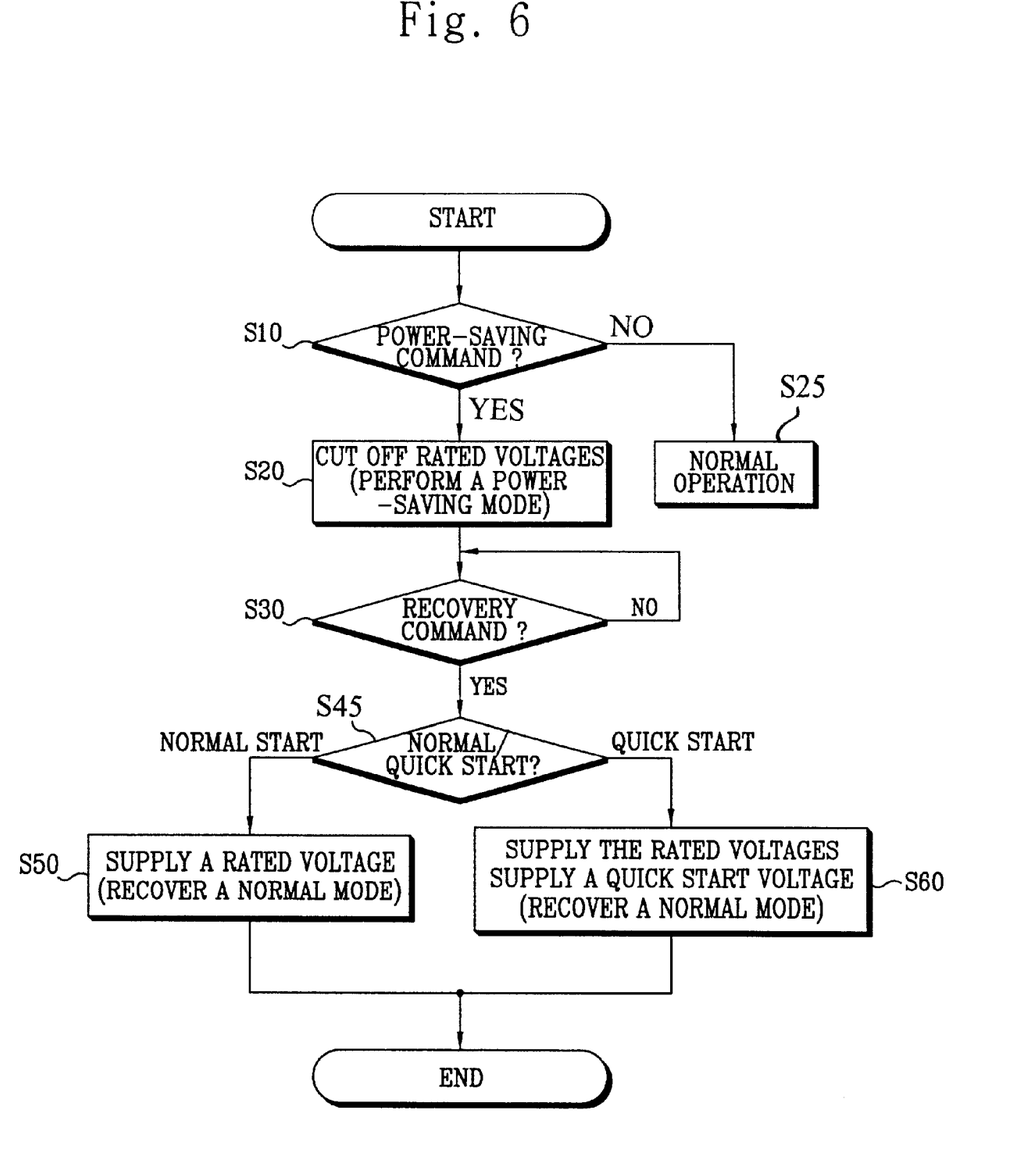
FIG. 6 is a flow chart showing a power-saving method of a video display device according to a second embodiment of the present invention.

Referring to FIG. 6, the control unit 20 determines whether a power-saving command is inputted from a computer main body in step S10. If the power-saving command is inputted, the control unit 20 cuts off all voltages supplied to peripheral devices, including the heater 10 of cathode ray tube 12, regardless of the kind of power-saving command in order to execute a power-saving mode in step S20. If the power-saving command is not inputted, normal operation proceeds in step S25.

That is, if the power-saving command is inputted, the control unit 20 outputs the first power-saving control signal S1 to the power switching circuit 40 regardless of the kind of power-saving command. Accordingly, the power-switching circuit 40 supplied with the first power-saving control signal S1 cuts off all rated voltages supplied to the respective devices by the power supply unit 30.

In the meantime, the control unit 20 determines whether a recovery command is inputted from the computer main body in step S30. If the recovery command is inputted, the control unit 20 detects the kind of power-saving command, and determines whether the power-saving command requests a normal start or a quick start in step S45.

The request of the normal start/quick start according to the power-saving mode is set in the manufacturing process of the video display device before it goes to the market.

At this time, if the power-saving command requests a normal start, the control unit 20 starts the supply of all voltages cut off so far for the recovery to the normal mode in step S50. If the power-saving command requests the quick start, the control unit 20 starts the supply of all voltages cut off, and supplies the quick start voltage V2 higher than the rated voltage V1 for a certain time period for the recovery to the normal mode in a step S60.

That is, if the power-saving command requests a normal start, the control unit 20 outputs the second power-saving control signal S2 to the power switching circuit 40 in step S50. The power switching circuit 40, supplied with the second power-saving control signal S2, starts all the rated voltages cut off so far as stated above.

Accordingly, a rated voltage V1 (for example, 6.2V), as shown in FIG. 4(a), is supplied to the heater 10, so that the heater 10 is heated at a normal speed as the normal mode is recovered from the power-saving mode.

Further, if the power-saving command requests a quick start, the control unit 20 outputs the second power-saving control signal S2 to the power switching circuit 40 at the same time as outputting the start control signal S3 to the quick start circuit 50 for four seconds in step S60.

Accordingly, the power switching circuit 40 supplied with the second power-saving control signal S2 starts the supply of all the rated voltages cut off so far, and the quick start circuit 50 supplied with the start control signal S3 supplies to the heater 10 the quick start voltage V2 (for example, 9 V), higher than the rated voltage V1 (for example, 6.3 V) for four seconds.

That is, the power switching circuit, 40 supplied with the second power-saving control signal S2 supplies the rated voltage V1 (for example, 6.3 V) to the heater 10, and the quick start circuit 50 applied with the start control signal S3 supplies to the heater 10 the quick start voltage V2 (for example, 9 V) higher than the rated voltage V1 (for example, 6.3 V) for four seconds, so that a voltage as shown in FIG. 4(*b*) rapidly heats the heater 10 when the normal mode is recovered from the power-saving mode.

At this time, the quick start circuit 50 has the same construction and operations as that of the first embodiment.

Further, a light-emitting diode (LED) may be mounted on the exterior of the video display device, so that the selections of the quick start mode/normal start mode can be indicated.

Accordingly, the second embodiment of the present invention minimizes power consumption by cutting off all voltages to the devices, including the heater 10, regardless of the kind of the power-saving command if the power-saving command is inputted, and reducing the stress phenomenon exerted on the heater 10 due to rapid heating by selectively heating the heater 10 of a cathode ray tube at a rapid speed or a normal speed according to the kind of the power-saving command if a recovery command is inputted, so that the excessive shortening of the life span of the cathode ray tube is prevented.

Here, the quick start and the normal start requests according to power-saving commands are set in the manufacturing process of video display devices before going out on the market.

At this time, at least one power-saving command of the standby power-saving mode, suspend power-saving mode, and off power-saving mode can request the quick start. For example, the quick start is requested only for the off power-saving command, only for the off power-saving command and the suspend power-saving command, or for all of the off power-saving commands, suspend power-saving command, and standby power-saving command.

In case the quick start is requested only for the off power-saving command and the suspend power-saving command, the reliability of the heater can be stabilized in particular.

Further, even though the second embodiment shows the stabilized reliability as stated above, the third embodiment described below enables users to select a normal start mode and a quick start mode, to thereby enhance the convenience to the users.

That is, in the third embodiment, if the normal start or the quick start is selected by the users in the use of an on-screen display (OSD) function, the normal start mode or the quick start mode selected by the users has the priority with respect to already requested normal start mode or quick start mode.

3. Third Embodiment

Figure 7:
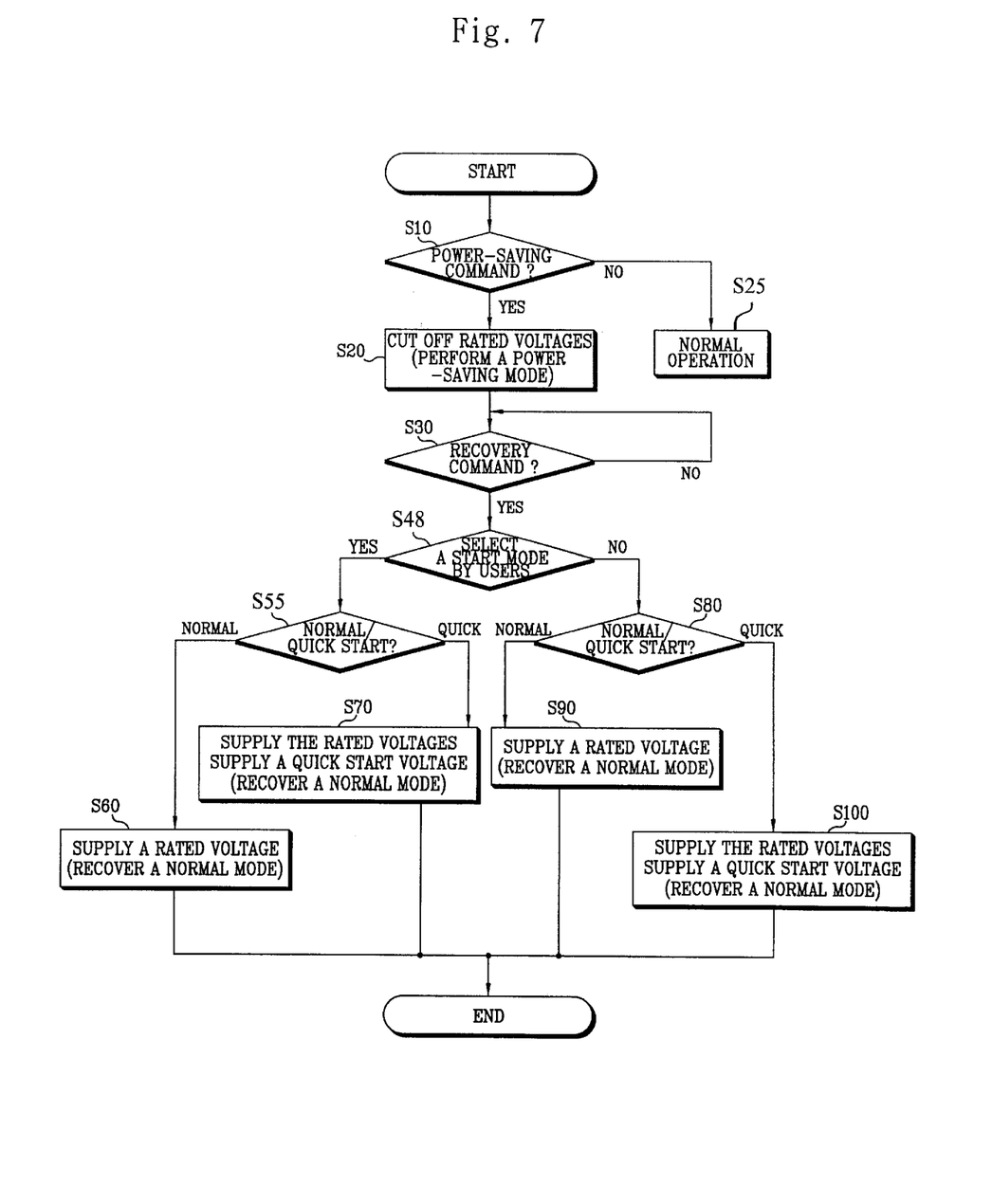
FIG. 7 is a flow chart showing a power-saving method of a video display device according to a third embodiment of the present invention.

Referring to FIG. 7, the control unit 20 determines whether a power-saving command is inputted from a computer main body in step S10. If the power-saving command is inputted, the control unit 20 cuts off all voltages supplied to devices, including the heater 10 of cathode ray tube 12, regardless of the kind of power-saving command to execute a power-saving mode in step S20. If the power-saving command is not inputted, normal operation proceeds in step S25.

That is, if a power-saving command is inputted, the control unit 20 outputs the first power-saving control signal S1 to the power switching circuit 40 regardless of the kind of power-saving command. Accordingly, the power switching circuit 40 supplied with the first power-saving signal S1 cuts off all the rated voltages supplied to the devices from the power supply unit 30.

In the meantime, the control unit 20 determines whether a recovery command is inputted from the computer main body in step S30. If the recovery command is inputted, the control unit 20 determines whether the start mode is selected by a user in step S48.

If the start mode is selected by the user in step S48, the control unit 50 determines whether a normal start mode or a quick start mode is selected in step S55.

At this time, if the normal start mode is selected by the user, the control unit 20 restarts the supply of all voltages cut off in step S20 regardless of the kind of power-saving command in order to recover the normal mode in step S60. If the quick start mode is selected by the user, the control unit 20 restarts the supply of all voltages cut off in step S20 regardless of the kind of power-saving command simultaneously with supplying to the heater 10 a quick start voltage V2 higher than a rated voltage V1 for a certain time period in order to recover the normal mode in step S70.

That is, if the normal start mode is selected by the user, the control unit 20 outputs the second power-saving control signal S2 to the power switching circuit 40, and the power switching circuit 40 supplied with the second power-saving control signal S2 restarts the supply of all the rated voltages cut off in step S60.

Accordingly, since the rated voltage V1 (for example, 6.3 V) as shown in FIG. 4(*a*) is supplied to the heater 10, the heater 10 is heated at a normal speed when the normal mode is recovered from the power-saving mode.

Further, if the quick start mode is selected by the user, the control unit 20 outputs the second power-saving control signal S2 to the power switching circuit 40 simultaneously with outputting the start control signal S3 to the quick start circuit 50 for four seconds in step S70.

Accordingly, the power switching circuit 40 supplied with the second power-saving control signal S2 starts the supply of all rated voltages cut off so far, and the quick start circuit 50 supplied with the start control signal S3 supplies to the heater 10 the quick start voltage V2 (for example, 9 V) higher than the rated voltage V1 (for example, 6.3 V) for four seconds.

That is, the power switching circuit 40 supplied with the second power-saving control signal S2 supplies the rated voltage V1 (for example, 6.3 V) to the heater 10, and the quick start to circuit 50 supplied with the start control signal S3 supplies to the heater 10 the quick start voltage V2 (for example, 9 V) higher than the rated voltage V1 (for example, 6.3 V) for four seconds so that a voltage as shown in FIG. 4(*b*) is supplied to the heater 10 to rapidly heat the heater 10 when the normal mode is recovered from the power-saving mode.

In the meantime, if the start mode is not selected by the user as a result of step S40, the control unit 20 detects the kind of the power-saving command and determines whether the power-saving command requests the normal start or the quick start.

The request of the quick start and the normal start according to the power-saving command are set in the manufacturing process of video display devices prior to their being placed on the market.

At this time, if the power-saving command requests the normal start in step S90, the control unit 20 starts the supply of all voltages cut off in step S20 to recover the normal mode, and, if the power-saving command requests the quick start, the control unit 20 starts the supply of all voltages cut off in step S20 simultaneously with supplying to the heater the quick start voltage V2 higher than the rated voltage V1 for a certain time period so that the normal mode is recovered.

If the user does not select the start mode, but rather a power-saving command does, it is determined in step S48 whether a normal or quick start is requested. If a power-saving command requests a normal start, the control unit 20 outputs the second power-saving control signal S2 to the power switching circuit 40, and the power switching circuit 40 supplied with the second power-saving control signal S2 starts all the rated voltages cut off in step S90.

Accordingly, a rated voltage V1 (for example, 6.3V) as shown in FIG. 4(a) is supplied to the heater 10 so that the heater 10 of cathode ray tube 12 is heated at the normal speed when the normal mode is recovered from the power-saving mode.

Further, if a power-saving command requests a quick start, the control unit 20 outputs the second power-saving control signal S2 to the power switching circuit 40 simultaneously with outputting the start control signal S3 to the quick start circuit 50 in step S100.

Accordingly, the power switching circuit 40 supplied with the second power-saving control signal S2 starts the supply of all the rated voltages cut off, and the quick start circuit 50 supplied with the start control signal S3 supplies, to the heater 10, the quick start voltage V2 (for example, 9 V) higher than the rated voltage V1 (for example, 6.3 V) for four seconds.

That is, the power switching circuit 40 supplied with the second power-saving control signal S2 supplies the rated voltage V1 (for example, 6.3 V) to the heater 10, and the quick start circuit 50 supplied with the start control signal S3 supplies to the heater 10 the quick start voltage V2 (for example, 9 V) higher than the rated voltage V1 (for example, 6.3 V) for four seconds so that a voltage as shown in FIG. 4(b) is supplied to the heater 10 to rapidly heat the heater 10 when the normal mode is recovered from the power-saving mode.

The quick start circuit 50 has the same configuration and operations as in the first embodiment.

Further, a light-emitting diode (LED) is mounted on the exterior of a video display device, so that the selections of the quick start mode and the normal start mode can be indicated.

The third embodiment of the present invention cuts off all voltages to the devices, including the heater 10, regardless of the kinds of power-saving commands in order to minimize power consumption if the power-saving commands are inputted, and, if a recovery command is inputted, the heater 10 of cathode ray tube 12 is heated by the selections of the users at a rapid speed or a normal speed regardless of power-saving commands, so that stress on the heater 10, which is caused by rapid heating, is reduced to prevent the life span of cathode ray tube 12 from being excessively shortened and to enhance convenience by enabling users to set computer peripheral devices according to the preferences of the users.

The selections of the quick start and the normal start are set by users through the use of the on-screen display function after the forwarding of the video display devices as stated above.

At this time, the quick start can be selected for at least one power-saving command of the three power-saving commands, that is, the standby power-saving command, suspend power-saving command, and off power-saving command, according to the DPMS standard. For example, the quick start can be selected only for the off power-saving command, only for the off power-saving command and the suspend power-saving command, or for all the off power-saving command, suspend power-saving command and standby power-saving command.

Further, the power-saving apparatus and method of the present invention are applicable to electronic appliances using heaters, as in a laser beam printer (LBP).

Figure 8:
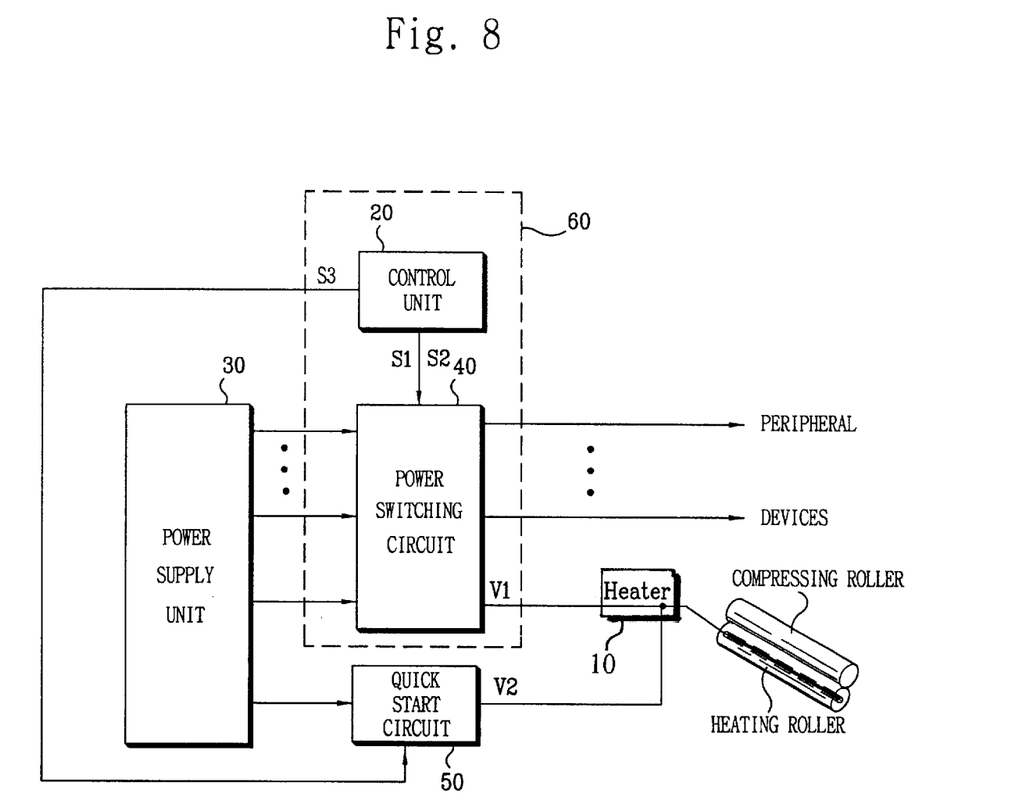
FIG. 8 is a flow chart showing a power-saving apparatus of a laser beam printer according to the present invention.

FIG. 8 is a block diagram showing a power-saving apparatus of a laser beam printer in accordance with the present invention. As shown in FIG. 8, the present invention can be applied to the heating of a heater for the purpose of heating fixer so as to fix toner on paper.

That is, the power-saving apparatus of a laser beam printer according to the first embodiment of the present invention includes: a heater 10 for a fixer; a control unit 20 for detecting at least two or more power-saving commands, for outputting a first power-saving control signal S1 regardless of the kind of power-saving command if the power-saving command is detected, and for outputting a second power-saving control signal S2 simultaneously with outputting a start control signal S3 for a certain time period if a recovery command is detected; a power supply unit 30 for supplying rated voltages required for peripheral devices; a power switching circuit 40 for cutting off the supply of all rated voltages to the devices, including the heater 10, if the first power-saving control signal S1 is inputted from the control unit 20, and for starting the supply of all rated voltages cut off if the second power-saving control signal S2 is inputted from the control unit 20; and a quick start circuit 50 for supplying to the heater 10 a quick start voltage V2 higher than a rated voltage V1 for a certain time period if the start control signal S3 is inputted from the control unit 20 so that power consumption is minimized by cutting off all voltages to the devices, including the heater 10, regardless of the kind of power-saving command if the power-saving command is inputted from a computer main body and the laser beam printer is normally operated within a short time period by heating the heater 10 at a rapid speed if a recovery command is inputted.

Further, a power-saving apparatus of the laser beam printer according to the present invention includes: a heater 10 for a fixer; a control unit 20 for detecting at least two power-saving commands, for outputting a first power-saving control signal S1 regardless of the kind of power-saving command if the power-saving command is detected, for outputting a second power-saving control signal S2 simultaneously with detecting the kind of power-saving command if a recovery command is detected, and for outputting a start control signal S3 for a certain time period if the power-saving command requests a quick start; a power supply unit 30 for supplying rated voltages required for peripheral devices; a power switching circuit 40 for cutting off all voltages supplied to the devices, including the heater 10, if the first power-saving control signal S1 is inputted from the control unit 20, and for starting the supply of all voltages cut off if the second power-saving control signal S2 is inputted from the control unit 20; and a quick start circuit 50 for supplying, to the heater 10, a quick start voltage V2 higher than a rated voltage V1 for a certain time period if the start control signal S3 is inputted from the control unit 20 so that the power consumption is -minimized by cutting off the supply of the voltages to all the devices, including the heater 10, regardless of the kind of power-saving command if the power-saving command is inputted from a computer main body. As a result, stress on the heater is reduced to prevent the life span of computer peripheral devices from being excessively shortened due to rapid heating by selectively heating the heater 10 at a rapid speed and a normal speed according to the kind of power-saving command if a recovery command is inputted.

As stated above, the present invention, when applied to computer peripheral devices using heaters, minimizes power consumption by cutting off the supply of all voltages to peripheral devices, including the heaters, regardless of the kind of power-saving command if the power-saving command is detected, and the computer peripheral devices are normally operated within a short time period by heating the heaters at a rapid speed if a recovery command is detected.

Further, in computer peripheral devices using heaters, the present invention minimizes power consumption by cutting off the supply of all voltages to peripheral devices, including heaters, regardless of the kind of power-saving command if the power-saving command is detected, and stress on the heaters due to the rapid heating of the heaters is reduced by selectively heating the heaters at a rapid speed or a normal speed according to the kind of power-saving command if a recovery command is detected, thereby preventing the life span of the computer peripheral devices from being excessively shortened.

Furthermore, the present invention, when applied to computer peripheral devices using heaters, minimizes power consumption by cutting off the supply of all voltages to peripheral devices, including heaters, regardless of the kind of power-saving command if the power-saving command is detected, and stress on the heaters due to the rapid heating of the heaters is reduced by heating the heaters at a rapid speed and a normal speed based on the selections of users regardless of the kind of power-saving command if a recovery command is detected, thereby preventing the life span of a cathode ray tube from being excessively shortened, and enhancing convenience by setting the computer peripheral devices according to the preferences of the users.

Although the preferred embodiments of the present invention have been described, it will be understood by those skilled in the art that the present invention should not be limited to the described preferred embodiments, but various changes and modifications can be made within the spirit and scope of the present invention as defined by the appended claims.

What is claimed is:

1. A power-saving apparatus for computer peripheral devices, comprising:
    a control unit for detecting at least two types of power-saving commands, for outputting a first power-saving control signal regardless of a type of power-saving command when the power-saving command is detected, and for outputting simultaneously a second power-saving control signal and a start control signal for a certain time period when a recovery command is detected;
    a power supply unit for supplying rated voltages required for the computer peripheral devices, including a heater, and the control unit;
    a power switching circuit for cutting off all rated voltages supplied to the computer peripheral devices, including the heater but excluding the control unit, when the first power-saving control signal is outputted by the control unit, and for starting the supplying of the cut off rated voltages when the second power-saving control signal is outputted by the control unit; and
    a quick start circuit for supplying to the heater a quick start voltage higher than a given rated voltage for a given time period when the start control signal is outputted by the control unit.

2. The power-saving apparatus as claimed in claim 1, wherein the quick start circuit includes:
    a first transistor having a base electrode for inputting the start control signal from the control unit through a resistor, having a grounded emitter electrode, and for performing a switch-on operation when the start control signal is outputted by the control unit;
    a second transistor having a base electrode connected through a resistor to a collector electrode of the first transistor, an emitter electrode supplied with the quick start voltage from the quick start unit, and a collector electrode connected in parallel with rated heater voltage supply lines, and for supplying the quick start voltage to the heater through a switch-on operation together with the switch-on operation of the first transistor; and
    a reverse voltage cutoff diode for preventing the rated heater voltage from being supplied to the quick start circuit.

3. The power-saving apparatus as claimed in claim 1, wherein the computer peripheral devices are video display devices having a cathode ray tube.

4. The power-saving apparatus as claimed in claim 1, wherein the control unit outputs the start control signal for a time period in a range of three to four seconds, and the quick start voltage is substantially 9V on average.

5. The power-saving, apparatus as claimed in claim 1, wherein a recovery time period is within four seconds as a normal mode is recovered from a power-saving mode.

6. A power-saving method for computer peripheral devices, comprising the steps of:
    (S10) determining whether a power-saving command is detected;
    (S20) performing a power-saving mode by cutting off all voltages supplied to the computer peripheral devices, including a heater but excluding a control unit, regardless of a type of a power-saving command when the power-saving command is detected as a result of the determining step S10;
    (S30) determining whether a recovery command is detected; and
    (S40) recovering a normal mode by starting the supply of all voltages cut off in the step S20 while simultaneously supplying, to the heater, a quick start voltage higher than a rated voltage for a certain time period when the recovery command is detected as a result of the determination in step S30.

7. The power-saving method as claimed in claim 6, wherein the computer peripheral devices are video display devices of a cathode ray tube.

8. The power-saving method as claimed in claim 7, wherein, when the recovery command is detected as a result of the determining step S30, in the step S40, the supply of all the voltages cut off in the step S20 starts while simultaneously supplying, to the heater, the quick start voltage of 9V on an averager for a time period in a range of three to four seconds.

9. The power-saving method as claimed in claim 6, wherein the certain time period of the recovering step S40 is no greater than four seconds as a normal mode is recovered from a power-saving mode.

10. A power-saving apparatus for computer peripheral devices, comprising:
- a heater;
- a control unit for detecting at least two types of power-saving commands, for outputting a first power-saving control signal regardless of the type of power-saving command when the power-saving command is detected, for outputting a second power-saving control signal while simultaneously detecting the type of the power-saving command when a recovery command is detected, and for outputting a start control signal for a certain time period when the power-saving command indicates a request for a a quick start;
- a power supply unit for supplying rated voltages required for the computer peripheral devices and the heater;
- a power switching circuit for cutting off the rated voltages supplied to the computer peripheral devices, including the heater but excluding the control unit, when the first power-saving control signal is outputted by the control unit, and for starting supplying of the cut off voltages when the second power-saving control signal is outputted by the control unit; and
- a quick start circuit for supplying to the heater a quick start voltage higher than a given rated voltage for a given time period when the start control signal is outputted by the control unit.

11. The power-saving apparatus as claimed in claim 10, wherein the quick start circuit includes:
- a first transistor having a base electrode for inputting the start control signal from the control unit through a resistor, having a grounded emitter, and for performing a switch-on operation when the start control signal is outputted by the control unit;
- a second transistor having a base electrode connected through a resistor to a collector electrode of the first transistor, an emitter electrode supplied with the quick start voltage from the power supply unit, and a collector electrode connected in parallel with rated heater voltage supply lines, and for supplying the quick start voltage to the heater through a switch-on operation together with the switch-on operation of the first transistor; and
- a reverse voltage cutoff diode for preventing a rated heater voltage from being supplied to the quick start circuit.

12. The power-saving apparatus as claimed in claim 10, wherein the computer peripheral devices are video display devices having a cathode ray tube.

13. The power-saving apparatus as claimed in claim 10, wherein the control unit outputs the start control signal for a time period in a range of three to four seconds, and the quick start voltage is substantially 9 V on average.

14. The power-saving apparatus as claimed in claim 10, wherein a recovery time is within four seconds as a normal mode is recovered from the power-saving mode.

15. A power-saving method for computer peripheral devices, comprising the steps of:
- (S10) determining whether a power-saving command is detected;
- (S20) performing a power-saving mode by cutting off all voltages supplied to the computer peripheral devices, including a heater but excluding a control unit, regardless of a type of the power-saving command when the power-saving command is detected as a result of the determining step S10;
- (S30) determining whether a recovery command is detected;
- (S40) detecting the type of the power-saving command when the recovery command is detected as a result of the step S30, and determining whether the power-saving command requests a normal start or a quick start;
- (S50) recovering a normal mode by starting the supply of all the voltages cut off in the step S20 when the power-saving command requests the normal start as a result of the step S40; and
- (S60) recovering the normal mode by starting the supply of all the voltages cut off in the step S20 while simultaneously supplying, to the heater, a quick start voltage higher than a given rated voltage for a certain time period when the power-saving command requests the quick start as a result of the step S40.

16. The power-saving method as claimed in claim 15, wherein the computer peripheral devices are video display devices of a cathode ray tube.

17. The power-saving method as claimed in claim 15, wherein, in the step S60, when the power-saving command requests the quick start as a result of the step S40, supply of all the voltages cut off in the step S20 starts simultaneously with supplying, to the heater, the quick start voltage of 9V for a time period in a range of three to four seconds.

18. The power-saving method as claimed in claim 15, wherein the recovery time is no greater than four seconds as the normal mode recovered from the power-saving mode.

19. A power-saving method for computer peripheral devices, comprising the steps of:
- (S10) determining whether a power-saving command is detected;
- (S20) performing a power-saving mode by cutting off all voltages supplied to computer peripheral devices, including a heater but excluding a control unit, regardless of a type of the power-saving command when the power-saving command is detected as a result of the step S10;
- (S30) determining whether a recovery command is detected;
- (S40) determining whether a start mode is selected by users when the recovery command is detected as a result of the step S30;
- (S50) determining whether a normal start mode or a quick start mode is selected when the start mode is selected by the users as a result of the step S40;
- (S60) recovering a normal mode by starting the supply of the voltages cut off in the step S20 regardless of the type of the power-saving command when the normal start mode is selected by the users as a result of the step S50;
- (S70) restoring the normal mode by starting the supply of the voltages cut off in the step S20, regardless of the type of the power-saving command, while simultaneously supplying, to the heater, a quick start voltage higher than a rated voltage for a certain time period;
- (S80) detecting the type of the power-saving command and determining whether the power-saving command requests one of the normal start and the quick start mode when the start mode is not selected by the users as the result of step S40;
- (S90) recovering the normal mode by starting the supply of the voltages cut off in the step S20 when the power-saving command requests the normal start as a result of the step S80; and (S100) recovering the normal mode by starting the supply of the voltages cut off in the step S20 while simultaneously supplying, to the heater, the quick start voltage higher than the rated voltage for a certain time period, when the power-saving command requests the quick start as the judgement result in the step S80.

20. In a computer peripheral device having a heater, a power supply unit, and a quick start circuit;

a power-saving apparatus for the computer peripheral device, said apparatus comprising a power-saving control unit for detecting at least one power-saving command received as an input, for controlling operation of the computer peripheral device at a minimum power consumption level regardless of a type of the power-saving command when the power-saving command is detected, and for supplying an overvoltage to the heater for a certain time period by operating the quick start circuit for a certain time period when a recovery command is detected.

21. In a computer peripheral device having a heater, a power supply unit, and a quick start circuit;

a power-saving apparatus for the computer peripheral device, said apparatus comprising a power-saving control unit for detecting at least one power-saving command received as an input, for controlling operation of the computer peripheral device in a minimum power consumption level regardless of a type of a power-saving command when the power-saving command is detected, for detecting the type of the detected power-saving command when a recovery command is detected, and for controlling supply of an overvoltage to the heater for a certain time period by operating the quick start circuit for a certain time period when the power-saving command requests the quick start.

* * * * *